(12) United States Patent
Thabit

(10) Patent No.: US 9,009,200 B1
(45) Date of Patent: Apr. 14, 2015

(54) METHOD OF SEARCHING TEXT BASED ON TWO COMPUTER HARDWARE PROCESSING PROPERTIES: INDIRECT MEMORY ADDRESSING AND ASCII ENCODING

(71) Applicant: Khalid Omar Thabit, Jeddah (SA)

(72) Inventor: Khalid Omar Thabit, Jeddah (SA)

(73) Assignee: Khalid Omar Thabit, Riyadh (SA)

( * ) Notice: Subject to any disclaimer, the term of this patent is extended or adjusted under 35 U.S.C. 154(b) by 0 days.

(21) Appl. No.: 14/303,365

(22) Filed: Jun. 12, 2014

Related U.S. Application Data

(63) Continuation of application No. PCT/US2014/038516, filed on May 17, 2014.

(51) Int. Cl.
*G06F 17/30* (2006.01)
*G10L 13/00* (2006.01)
*G06F 17/22* (2006.01)

(52) U.S. Cl.
CPC ...... *G06F 17/30657* (2013.01); *G06F 17/2205* (2013.01); *G06F 17/30067* (2013.01)

(58) Field of Classification Search
CPC .......... G06F 17/30067; G06F 17/30569; G06F 17/30657; G06F 17/2205
See application file for complete search history.

(56) References Cited

U.S. PATENT DOCUMENTS

| | | | |
|---|---|---|---|
| 6,249,283 B1 * | 6/2001 | Ur | 715/764 |
| 8,516,280 B2 * | 8/2013 | Felch et al. | 713/300 |
| 2003/0065652 A1 * | 4/2003 | Spacey | 707/3 |
| 2010/0146493 A1 * | 6/2010 | White | 717/140 |
| 2012/0020161 A1 * | 1/2012 | Haukness | 365/185.17 |

* cited by examiner

*Primary Examiner* — Tarek Chbouki
(74) *Attorney, Agent, or Firm* — Geeta Kadambi; Riddhi IP LLC

(57) ABSTRACT

A method and process for searching and inserting a word or set of words in a large data set for real-time data intensive search applications using memory banks is disclosed. Traditional search methods optimize time and space by pre-sorting the data so that fast search can be accomplished. Unfortunately, in real-time search intensive applications, it is almost impossible to take a snapshot of the data set during real-time while the transactions are happening to sort and search for a word or set of words. The instant method and process is an innovative way to use unordered list for searching the data real-time without the requirement to pre-sort the data. The time complexity of the proposed method is very fast. In addition, the proposed method does both insertion and searching reducing the code complexity and time using indirect addressing in memory banks.

14 Claims, 16 Drawing Sheets

METHOD OF SEARCHING TEXT BASED ON TWO COMPUTER HARDWARE PROCESSING PROPERTIES: INDIRECT MEMORY ADDRESSING AND ASCII ENCODING

CROSS REFERENCE TO RELATED APPLICATIONS

The instant application is a national stage entry for the PCT application filed in US receiving office and claims priority to PCT/US14/38516 on May 17, 2014. The disclosure is hereby incorporated by this reference in its entirety for all of its teachings.

FIELD OF TECHNOLOGY

The present invention relates to a method and process for inserting, storing and searching list of words in high speed memory banks using two computer hardware processing properties: indirect memory addressing and ASCII encoding.

BACKGROUND

Searching is a very fundamental operation in computing, where a method is used to find an attribute within a large collection of attributes. For example, a number could be searched within a collection of numbers or a word can be searched within a collection of words in a database.

Searching methods, in general, needs to be fast as applications searching for an attribute are gated by the answer obtained back through searching. For example, if search is successful, the logic follows a course of actions compared to when search is unsuccessful.

Popular searching method includes Binary search. However, Binary search requires pre-processing of the data, typically sorting. Methods such as Binary search are very conducive when operated on the data that are complete and stable. They achieve Log(N) speed when data (of size N) is ordered. However, many data-intensive applications are evolving and it is very difficult to draw a line and take a snapshot of data to operate on for searching purposes.

Some of the applications that are data-intensive belong to fields such as banking, airline and hotel reservations. Banking transactions continuously happen and searching for particular information happen in parallel. For example, in applications such as credit card companies, and universities, new records are added all the time. It is cumbersome to sort and re-sort to be operated on by search methods that depend on sorted data.

Most industries sort the data in a pre-determined time slot (example—night time) by taking a snapshot, so that interruptions are not there while transacting. Unfortunately, the sorted list will not be up-to-date.

On the contrary, to keep the list sorted all the time is difficult, as well, since insertion of a new item into a sorted list takes time. When applications have millions of transactions, it is very difficult to devote time to keep the information sorted just for optimal searching purposes. There is a need for a different method for searching in order to minimize time, power and computer memory.

SUMMARY

In the present disclosure, a novel method and process of inserting and searching a word in a list of words stored in memory banks residing in the processor or the computer hardware is described. In one embodiment, the method of inserting the word into an indexed based array using memory banks is done. In another embodiment, method of searching of a word from the same indexed based array is accomplished, thus avoiding the necessity to perform the task of sorting before searching the array.

In one embodiment, a method and a process for the use of ASCII encoding and indirect memory access for inserting and searching is described. The minimum requirement is that one has access to at least a memory bank that is 256 bytes in size. In one embodiment, we divide the memory bank into two memory banks and for example calls them memory bank A and memory bank B. In one embodiment, we initialize memory banks A and B by making all their entries set to zero. Method of insertion is a memory write while the method of searching is a memory read.

In the instant method and process for insertion, in one embodiment, the first step is by starting to write all single character syllables into memory bank B in the order in which they occur. Then, the next step is, to read the ASCII code of the first character in memory bank B. Contiguous addresses of the memory bank A denotes all the ASCII codes in a specific order. As a second step, write in memory bank A, at the location set by ASCII code of the first character as value one denoting that it is the first character to occur. Again find the ASCII code of the second character in memory bank B and write in memory bank A at the memory location set by its ASCII code, the value two. Continue reading all the characters in memory bank B and writing their corresponding location in memory bank A in an address set by their ASCII code.

In the third step, as a method and process for insertion, all two character syllables present in a word are inserted in memory bank B and A respectively. As an example, for address writing operation, for the two character syllables, we require a number of memory block A, that may be equivalent to the number of characters in memory block B. As a further step, reading of the first two character syllable is done, and then determination of the ASCII code of its first character is performed. This ASCII code determines the memory block number where the location of this two character syllable will be placed. Getting the ASCII value of the second character, this value gives the address within the selected memory block, here the address of the two character syllable is written in this memory block.

In the fourth step, all three character syllables in a number of memory banks are also inserted and written. For address writing of these three letter syllables, we require a number of memory banks equivalent to the number of all two character syllables. Read the first two characters, and then get the address of the two character syllable as done in the previous paragraph. Using the value read to determine the memory bank number, where the address of the three letter syllables be placed. The ASCII value of the third character determines the location in the selected memory bank where the address of the three character syllable is to be placed.

These reading and writing processes continue until all syllables of all sizes are read and their location are written to their specified locations. For a syllable of length N, its address will be written in memory block number equivalent to the address of syllable of length N−1. The ASCII of character N determines the location within the selected memory block where the address of the syllable with N characters will be placed.

In one embodiment, searching is performed and searching is the reverse operation of insertion. For example, given an N character syllable, we first get the location of its first two character syllables using their ASCII code in memory block A to get their location in memory block B. Using these two location values to read the location of the two character syllable. The location of the two character syllable along with the location of third character to get the location of the three character syllable. Again using the location of the three character syllable along with the location of the fourth character, we get the location of the four character syllable. The search continues using this methodology of ASCII encoding and indirect memory addressing until we get the location of syllable of length N. If its value is non-zero then this syllable is found and its location is given, otherwise, value is zero, the syllable is not found.

General search methods use an insertion technique that is ordered, where insertion takes time to place the words in the right order. The present techniques take time to build the data structure and applications involving larger number of transactions cannot afford such delay during the search process.

General search methods search either a word or group of words; assume the data is ordered through sorting so that a quick search can be accomplished. For example, Binary search methods in an already ordered or sorted group of data are efficient. However, it takes time to order the data through sorting. Fast searching applications such as search engine cannot afford to keep ordered data up-to-date all the time.

General search methods contain a single sorted data structure or array of words using memory banks, in case a collection of words need to be searched for a particular word. In our proposed method, multiple numbers of arrays stored in efficient memory banks are used for the search process. One array through memory banks is used to store the words to be searched while multidimensional arrays are used to store the location of all the words, syllables and characters.

In the proposed method, both insertion of words to the data structure and searching of a word within the data structure are handled. Words are categorized as of length one, two or less than Maximally Distinguishable (MaxDist). MaxDist is the length of the longest matching portion of the searched word already present.

Other features will be apparent from the accompanying figures and from the detailed description that follows.

BRIEF DESCRIPTION OF THE DRAWINGS

Example embodiments are illustrated by way of example and no limitation in the graph and in the accompanying figures, like references indicate similar elements and in which.

Figure 1:
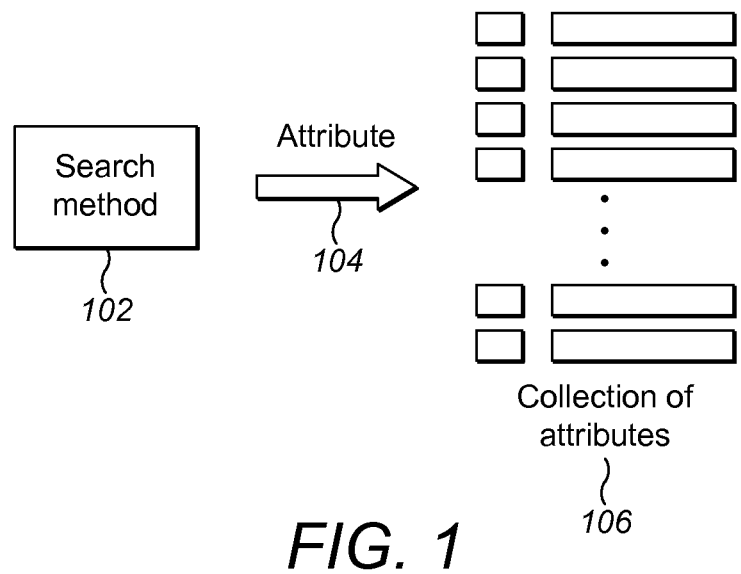
FIG. 1 illustrates the high level architecture of a search operation, where a search method is used to search an attribute among a collection of attributes.

Other features of the present embodiments will be apparent from the accompanying detailed description that follows.

DETAILED DESCRIPTION

The present disclosure relates to a method and process to perform insertion of a word or a group of words and search in a fast manner. More specifically a memory bank is used efficiently to record and assign ASCII values for each character for the word or group of letter or group of words. There is no sorting of the data during the method and process for insertion and search.

In the current state of the art sorting is introduced as a precursor to minimize the memory. However memory is becoming cheap nowadays and that constraint can be relaxed to achieve speed and real-time computation.

Data intensive applications: The present invention relates to insertion and searching method and processes, where a word or set of words are inserted into large list of data and searched in a large list of data and. Example of such data intensive applications that the instant method and process for inserting and searching may be used are present in banking, hotel management, search engines, university registration and warehouse inventory etc.

In the instant method and process a description of a method that inserts fast in an un-ordered data list, while searching is done in real-time quickly, is described. The method is predominantly to search quickly and immediately using an un-ordered data foregoing memory constraint.

Processor speed has grown from 2.4 MHz in 1980 to 2.4 GHz in 2013, over 1000 folds. During the same period, the primary memory has grown from 4 KB in 1980 to 4 GB in 2013, an increase of million folds. In addition, portable memory space is available in plenty to operate data on. For example, a simple memory stick comes today with 128 GB! Therefore the instant method and process takes advantage of memory for achieving speed. Traditional search methods optimize time and space by foregoing real-time computation. Hence, they operate on either stale data or take longer time to optimize space. However, using the proposed method, we can operate with speed and real-time intact by relaxing memory space requirement. Proposed method also works well in space-intensive applications, such as cloud computing and large database applications, such as university records, airlines, search engines and banks.

A typical search engine has 200 Million hits per day with over a billion search operations per day. To keep the data pre-sorted on a daily basis is practically impossible. A periodic snapshot of sorted data is possible but not up-to-date sorted data. Therefore methods such as Binary search are difficult and complex to operate on such applications.

We present a search method using un-ordered data for searching words. In short, given a list of words to be searched we create a multiple number of string arrays to store the words, syllables and the character set of words to be searched. The data structure is constructed using word arrays of multiple dimensions, so that the search can be done anytime with a best case of single operation, i.e., O(1) and worst case of the length of the word, i.e., O(L)!

The method is fast since the number of large words in dictionary is small. As a matter of fact, majority of words in the dictionary are below sixteen characters. As one method all words of sixteen characters or more could be trimmed to words with less than sixteen characters and still remain distinct and distinguishable. The large words are trimmed to a size we call the Maximally Distinguishable. Finally, the average word length is about 4.5 characters. Furthermore, the English Wikipedia has over 2.5 billion words and an average word size of five characters per word. This indicates that our methods may achieve about O(5), or on the average of five operations per search.

Applications with real-time data: Applications such as search engines require real-time data manipulation. This means, data are continuously being searched and inserted, and there is no "free" time where the data can be taken off-line and sorted. Applications such as these require smart searching and insertion methodology where it can be done in a quick fashion. To do it fast, the arrays are stored as memory banks in memory hardware for faster access and transfers. The memory banks may reside in processors, computer hardware and cloud.

Search requirements in applications: Applications such as search engines normally require a word or set of words (sentence) to be searched in a big set of data collected over a period of time. Data intensive applications normally perform searching and insertion with requirements of speed. The application requires a word or set of words to be located in a set of massive data collection. Traditional mechanisms expect such speed to be achieved by keeping this massive data collection sorted, so that whenever there is a requirement to search, it becomes easy. However, when the application is continuously updated and data is changing real-time, it is extremely difficult to stop the process to keep the data sorted. Therefore there is a need to find an insertion and searching method and process that is efficient in performing the functions fast.

Insertion requirements in applications: Applications such as search engines not only want to search the data, but also insert the word or a set of words that are being searched. The knowledge base is kept up-to-date by learning new words that are being searched. In addition, other applications such as banking require specific function to search for a word (name of a person) or set of words (address), and the insertion function is used for inserting a new word into the data specifically. Real-time applications require insertion function to insert quickly and into the data structure that can be used for searching as well. In the propose method, we show that the methodology for insertion is a subset of searching. For inserting a new word, we search and insert in the right place so that future searches of that word can be done quickly. The proposed method uses unordered list array as a data structure to store words that are stored in memory banks for fast access and transfers.

Data Sorting: Generic sorting techniques use complex data structures such as trees to order the data. To accomplish that, one expects the complete set of data to be available apriori. Sorting techniques, such as quick sort are used to order the data, on which the searching is done. Though this method can be quick (as low as O (N log N) for a data set of N elements), the expectation is for the set of data to be available for a period of time when transactions are not occurring. In real-time applications, to find such a pause is very difficult due to unpredictable nature of transaction times. Therefore there is a necessity to find a fast searching method that operates on an unordered list of data rather than sorting as a pre-condition.

Generic Search Methods using Ordered Data: Generic search techniques use sorting procedures on the data structure to order the data. Once the data is ordered, it becomes easy and fast to search. On a dataset of N elements, searching can be accomplished in O (log N) after sorting the data using at least O (N log N). The issue of having data ordered is that the transactions have to be paused to complete the sorting mechanism separately if the data needs to be stable. If the transactions continue which a copy of the data is sorted, then the searching on the sorted data is done using stale data. The proposed method does not require separate sorting and the construction of the data is done using unordered list. The fast searching, done without pre-sorting, is indexed based array search where the data is stored for fast access in memory banks. The procedure is used for insertion leading to dual use.

Complexity of Generic Search Methods: To accomplish a search on an ordered data for a data set of N elements is as low as O (log N). However, this does not take into account the complexity to condition the data apriori. The proposed method is very fast, with best case of O (1) in an unordered data and the worst case of O (length of the word). It is important to note that English language contains higher number of words with less number of characters (small length).

Data Storage—Data Structure: Data structure used for storing data is based on abstract data types in general. However, to use those data types, such as tree for pre-sorting needs a snapshot of the data which a real-time application cannot afford. The proposed method uses an unordered list as a data type, implemented using an array structure for convenience and speed.

Data Storage—Index based Arrays: Index based arrays used in the proposed method provides the flexibility to address a particular data in a single step, while keeping it logically continuous. The high usage of memory in arrays due to apriori declaration of the size is a challenge. However, memory as explained earlier is becoming more and more inexpensive and can be compromised to achieve speed and accuracy. In addition we propose using high speed memory banks for operating the data and storing indexed based arrays to gain speed of transfers.

Time Versus Space Complexity: Generic search methods optimized both time and space while trying to work things out off-line where need be. However, in the past ten years, where real-time data intensive search applications are so response time sensitive that off-line computation, such as sorting, is not possible. Therefore optimizing the time and space of search and sort algorithms alone is not enough. Optimizing the algorithm speed and response is important. In our method, we introduce a fast searching mechanism that provides instant response without any off-line sorting requirement.

FIG. 1 is a diagram illustrating the high level architecture of search operation. A search operation consists of a search method 102, an attribute that needs to be searched 104 and a pre-determined collection of attributes 106 connected in a special way. For example, in this application we introduce a new search method that efficiently searches an attribute 104 or a set of attributes among a collection of already learnt attributes 106 arranged in an un-ordered list of arrays.

Figure 2:
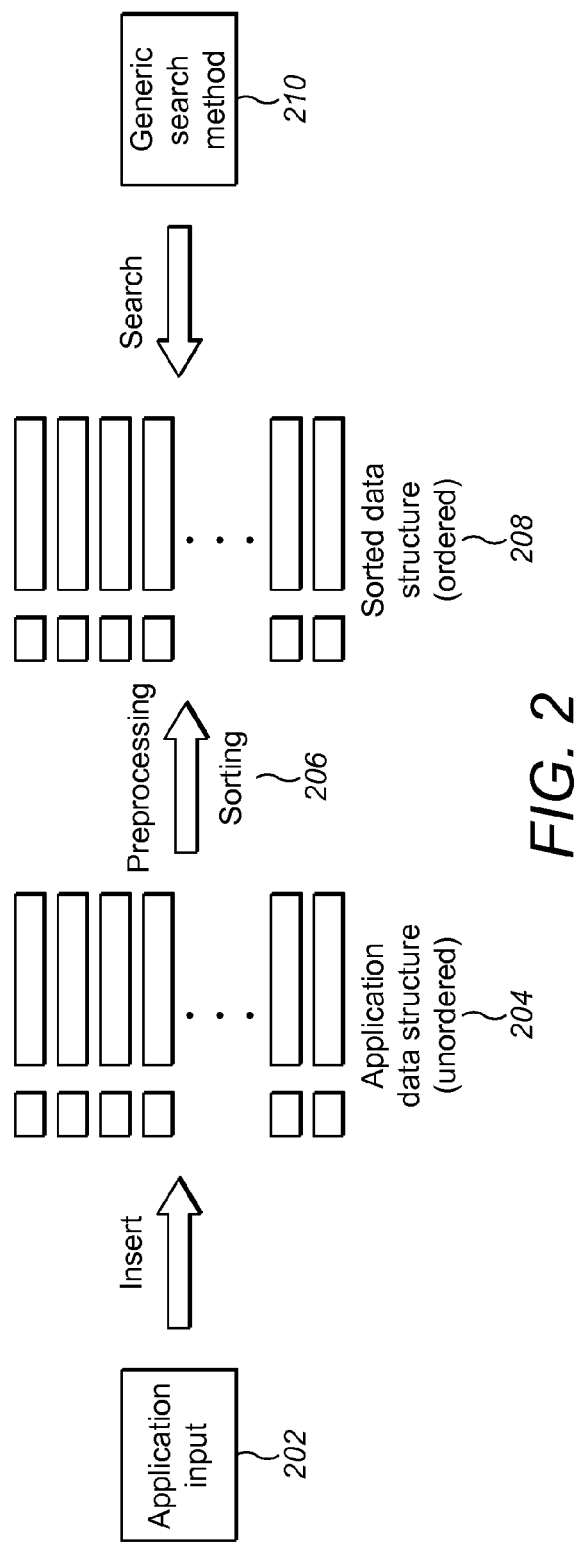
FIG. 2 depicts generic search methods, where an input from an application is inserted into an unordered data structure first. The data structure is presorted before a generic search method operates on that data to find an attribute.

FIG. 2 is a depiction of generic search methods, where an application 202 contributes to the set of words that are inserted as part of an unordered data structure to build the data base. This goes through another stage of sorting 206 to make it ready for searching. Whenever a word or set of words need to be searched, a generic search method 210, such as Binary search, operates on the sorted data 208 to find if the word or set of words are there or not. Therefore two stages of processing is involved, first to insert the word and second to sort the complete data structure to keep it up-to-date and enable fast searching on a sorted data. Unfortunately, two stages take more computation time and to keep the sorted data up-to-date on an application that inputs real-time, such as search engines or stock market data is difficult or impossible.

Figure 3:
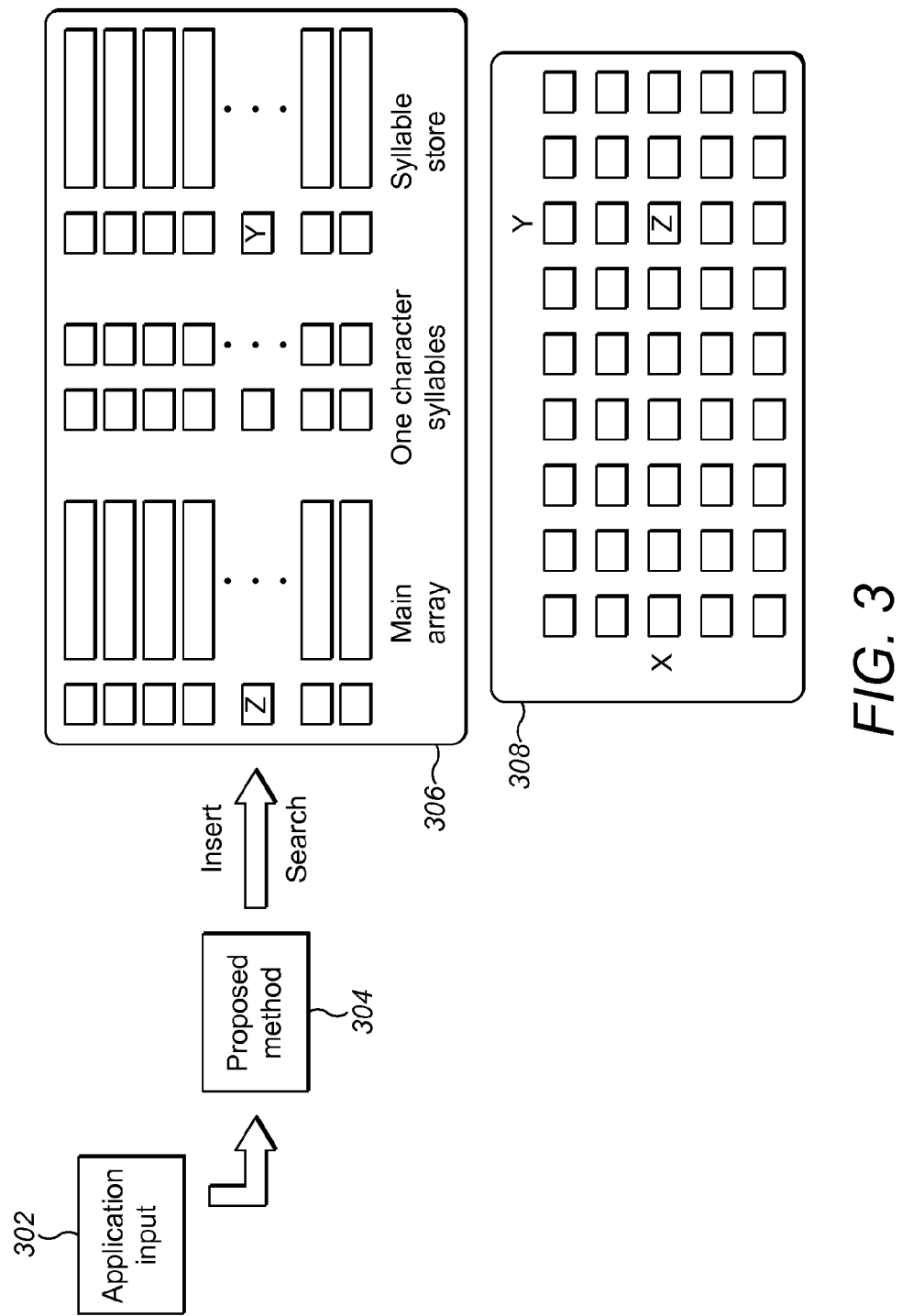
FIG. 3 shows the proposed fast index based search method where the words are stored in a main array based on memory banks and as syllables and character locations.

FIG. 3 is a diagram of the proposed fast indexed based search method. This is done by using memory banks for storing the data and operating on the data. The application input 202, inserts the words or list of words. Our proposed method provides both insertion and search functionality 304 by inserting new words into the unordered indexed based data structure arrays 306. Main array 306 consists of set of words to be searched. In insertion a new word is placed in Main array memory bank at location Z. The last character of this new word is placed in the One Character Syllable at location Y. The remaining syllable is placed in the Syllable Store at location X. The value Z is then placed in the multidimensional memory bank array FindWordLocation 308 at the location indexed by X and Y.

In searching the last character of the word that needs to be searched, first it is looked for in the One Character Syllable (let us say we find it at location X), then remaining syllable is looked for in the Syllable Store (at location Y). Using X and Y as indices in the FindWordLocation memory bank 308 to get the location (or index Z) of the word in Main array memory bank.

Proposed Search Method using Unordered Data: The fast response of the method is achieved by using unordered data structure, where the data set is created as and when a new word is inserted, conducive for later searching. In addition the data is stored in high speed memory banks for fast access. Fast response is also achieved by using common functions for both searching and insertion. The unordered data is constructed with only three set of word arrays 306, namely main array memory bank for storing words, one character syllables to store single character occurrence and syllable store for storing syllables. These three arrays are manipulated to store all the words and quickly search using proposed method.

Optimization of Search Procedure: The proposed method optimizes the search procedure by keeping track of the maximum distinguishable length of the word 404 in the data set. This allows the search procedure to confine search to the maximum distinguishable length, rather than the full length of the word to be searched. All the words that need to be inserted are filled into Main array memory bank, which is an array of words 406.

Figure 4:
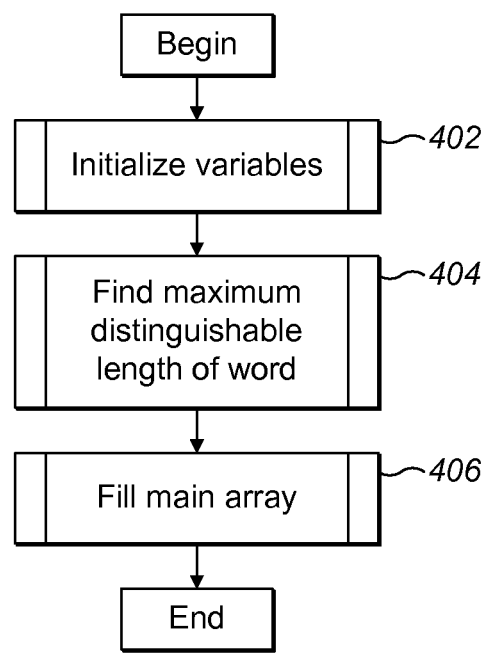
FIG. 4 shows the proposed methodology to fill the main array memory bank.

FIG. 4 shows the proposed methodology to fill the main array memory bank 406 with words that are to be searched. Filling the array with complete words and searching in database increases the search time for long words. Therefore, we find the maximum distinguishable length of the word, namely the length of the subset of word that is distinguishable 404 so that words can be trimmed.

Figure 5:
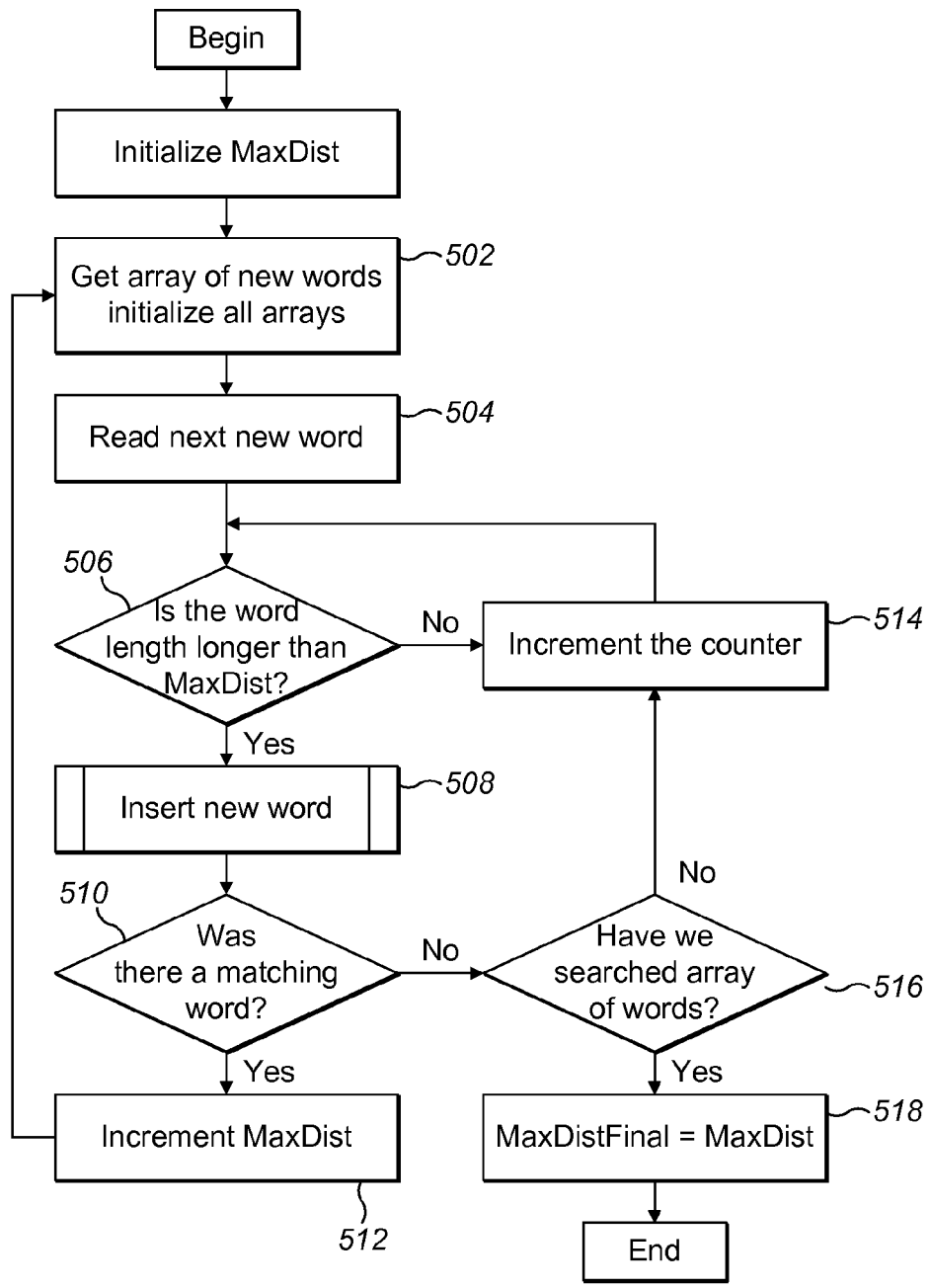
FIG. 5 shows the procedure to find the maximum distinguishable length of the word before inserting into main array.

FIG. 5 shows the procedure to find the maximum distinguishable length of the word before inserting into main array memory bank 406. The idea here is to find a length that every long word if trimmed to this size then it will be distinct. No other word would match this trimmed word. The output of the next procedure is an array of trimmed words that are all of length MaxDist and distinct. The steps of the procedure are as follows:

Initialize the first MaxDist value: Get the array of new words to be searched and initialize all arrays 502. Continuously read the next new word from the list of new words 504. If the word length is equal or longer than maximum distance observed thus far 506, then the new word is inserted 508.

If the word was found to be already there during insertion 510, then maximum distances is incremented and the procedure starts all over again from the beginning and redo the insertion again. If not 516, then go to the next word 514. If all words are checked, then the final maximum distance found will be the maximum distinguishable length 518.

Figure 6:
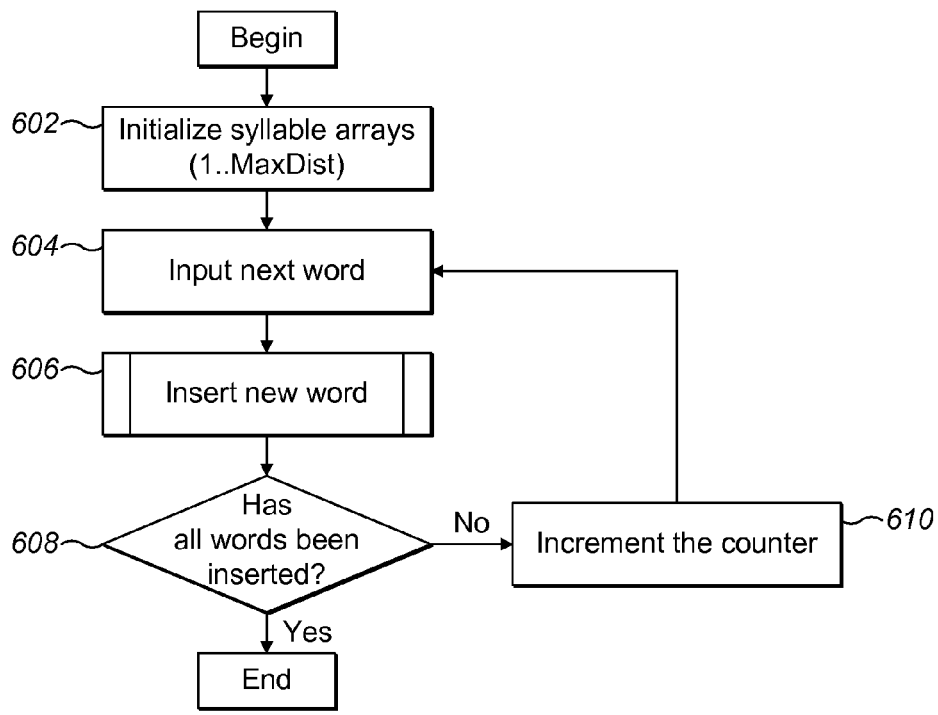
FIG. 6 shows the method to fill the main array after finding the maximum distinguishable length.

FIG. 6 shows the method to fill the main array memory banks, after finding the maximum distinguishable length. The method reads the word to be searched 604 and uses the insertion procedure 606 to fill the main array memory bank until all words are inserted 608.

Figure 7:
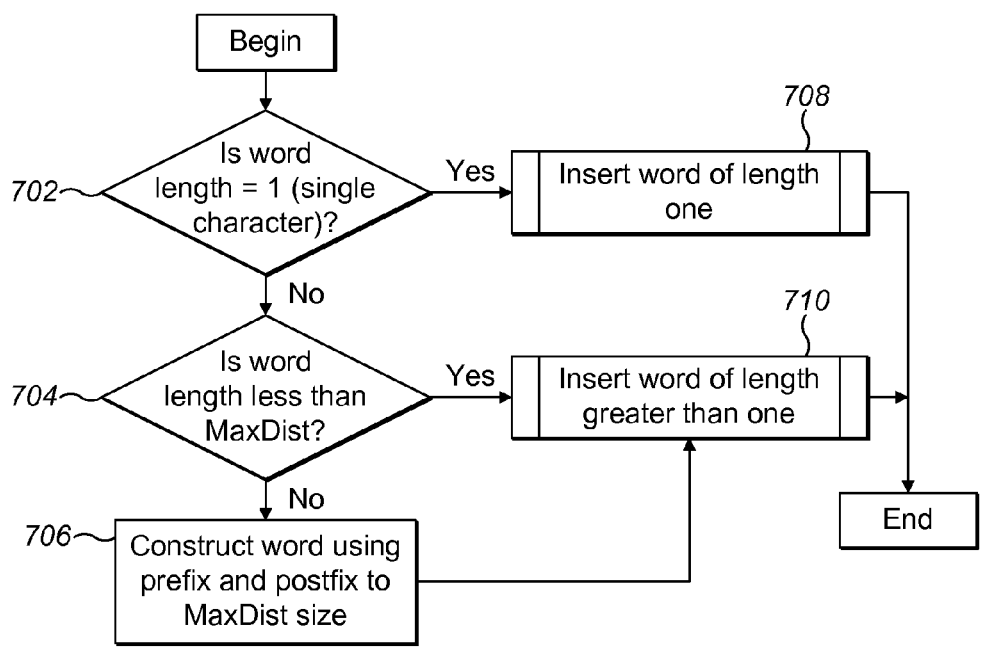
FIG. 7 shows the procedure to insert words of various sizes.

FIG. 7 shows the insertion procedure for a new word 606. If a word is of length 1, namely single character words 702, the word is inserted into One Character Syllable data structure 708. If the word is of length greater than one, i.e., if the word is not a single character word 704, then the word is inserted into data structure for Multiple character syllable 710. If the word is greater than maximum distinguishable length, then it is inserted after parsing into prefix and postfix and trimming it to MaxDist size 706.

The method used for inserting the new word is Insert New Word 606. The new words to be inserted are checked if it is a single character word 702 or words that are longer 704. Search New Word follows the same procedure as Insert New Word, as the location for inserting the new word will be not empty if already present—leading to positive search.

Figure 8:
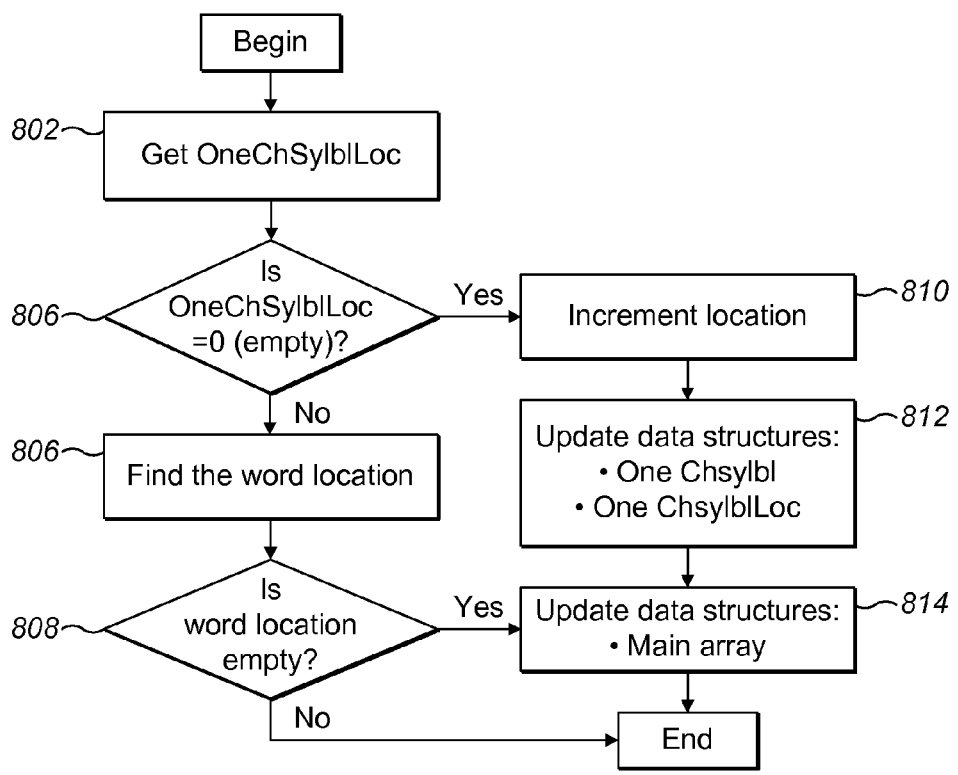
FIG. 8 shows the procedure to insert single character syllable.

FIG. 8 depicts the flow chart of the procedure to insert a single character word 708, i.e., word of one character syllable. First the location of the character is checked in an array 802. If the location flag is empty 804, then the location flag is incremented 810 and the data structures updated 812 to reflect the learning of new single character word followed by the update of Main array memory bank to reflect the insertion 814. If the location flag is not empty, then the word is located 806, followed by an update of main array memory bank 814.

Figure 9:
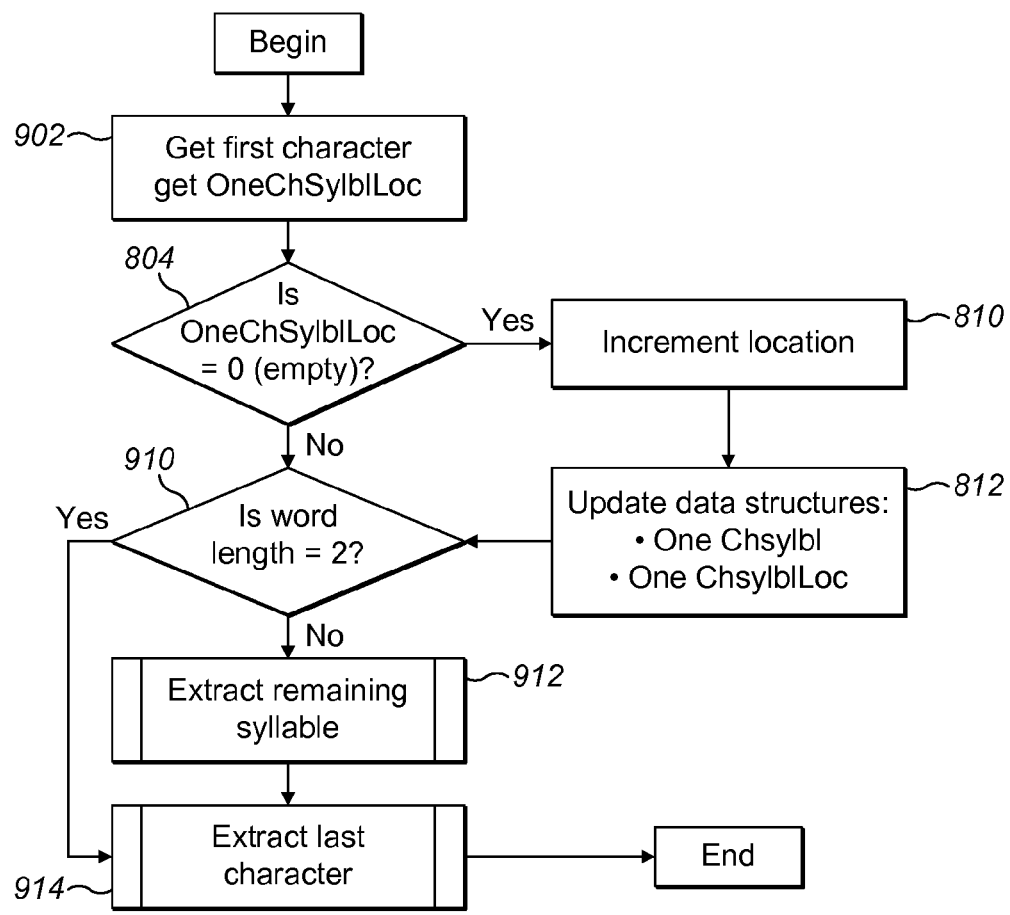
FIG. 9 illustrates the procedure to insert syllables of length greater than one.

FIG. 9 shows the steps taken to insert words of length greater than one 710. The initial step is to read the first character of the word 902 and check if the first character exists in single character data structure 804. If it does not, then similar procedure as insertion of single character is followed 810 and 812. This is followed by extraction of remaining syllables 912 in case the word length is over two. If the word length is two, then the remaining syllable is also a single character, in which case it is extracted 914 as a separate procedure.

Figure 10:
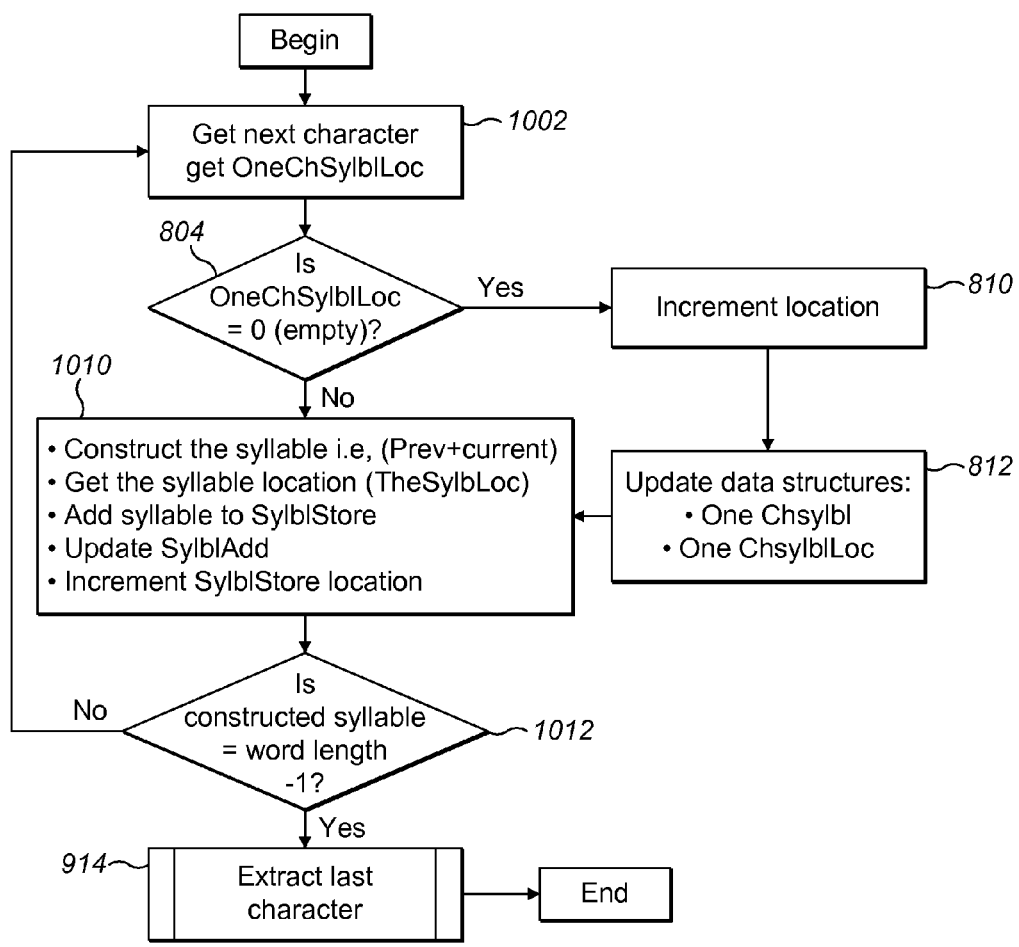
FIG. 10 illustrates the extraction of syllables after the first syllable.

FIG. 10 shows the procedure to extract remaining syllables 912. The first character of remaining syllables is read 1002 and this single character location flag is checked 804 and if empty the location is incremented 810 and data structures updated 812. If the first character location flag is not empty, then remaining syllable is constructed 1010 character by character until the last character is extracted 914.

Figure 11:
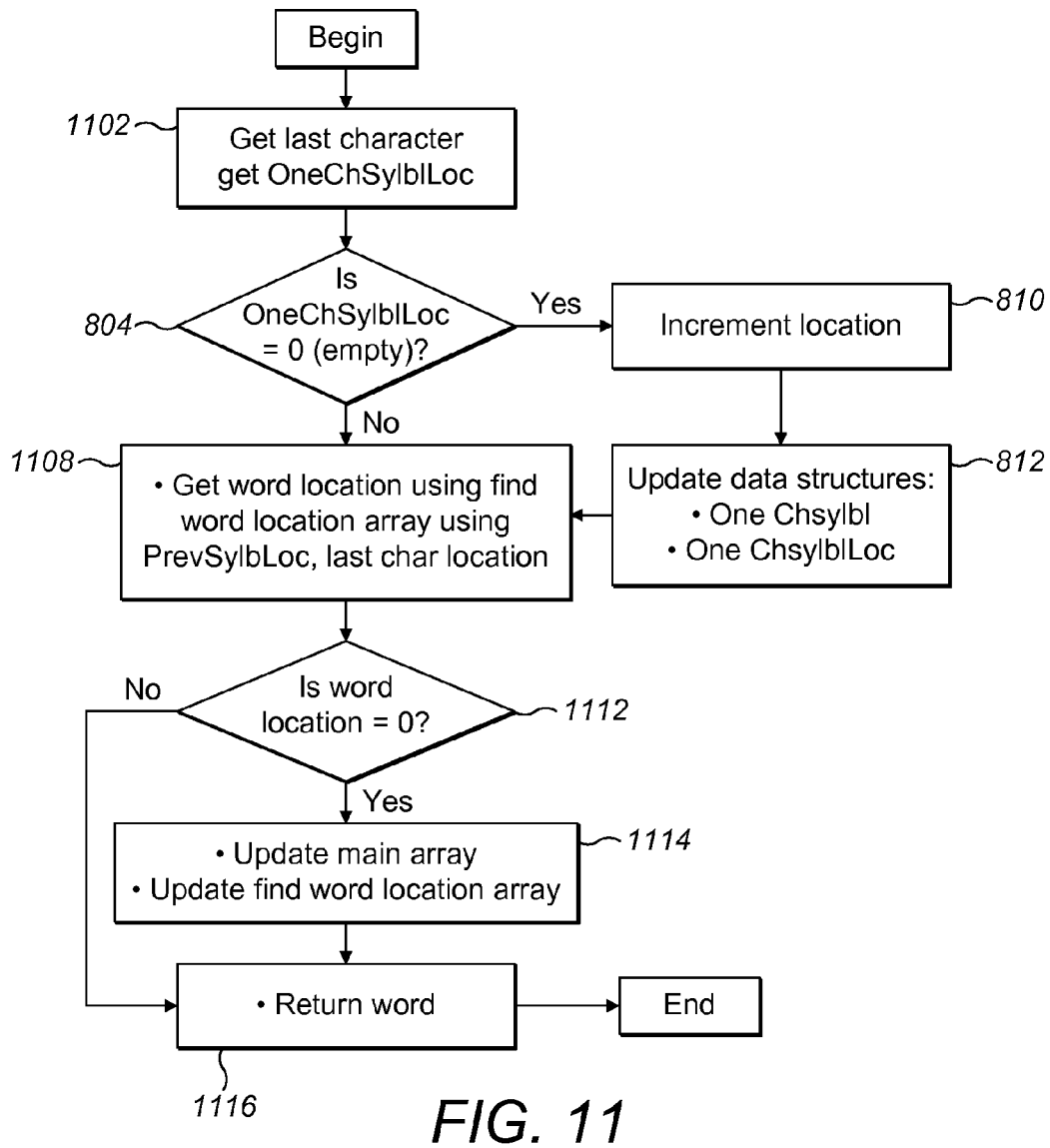
FIG. 11 illustrates the procedure to extract the last syllable.

FIG. 11 shows the procedure to extract the last character 914. It follows similar steps as inserting single character 804, 810 and 812 if the character is not located. The word location is determined and if the word is found 1112, then the main array memory bank is updated 1114 and the word location 1116 is returned to the insert new word procedure stating that word is found. If the word is not found, then the new word is inserted and the word location is returned.

Figure 12:
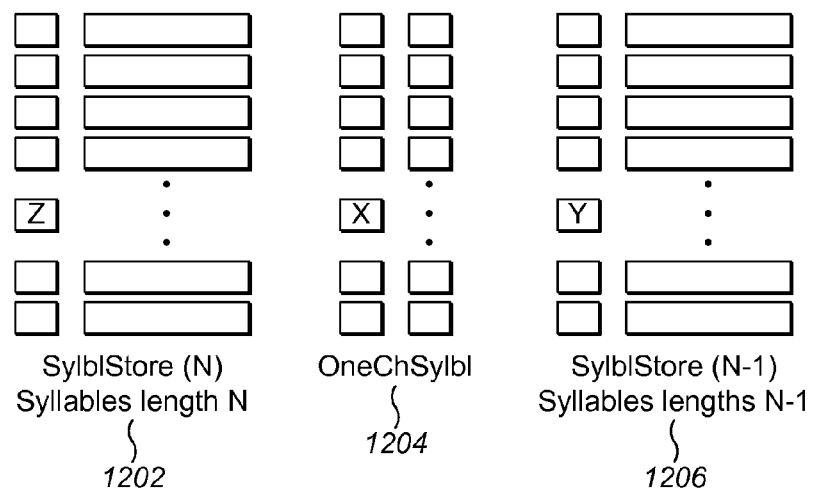
FIG. 12 illustrates the data structure for storing various syllables and words.
Figure 12:
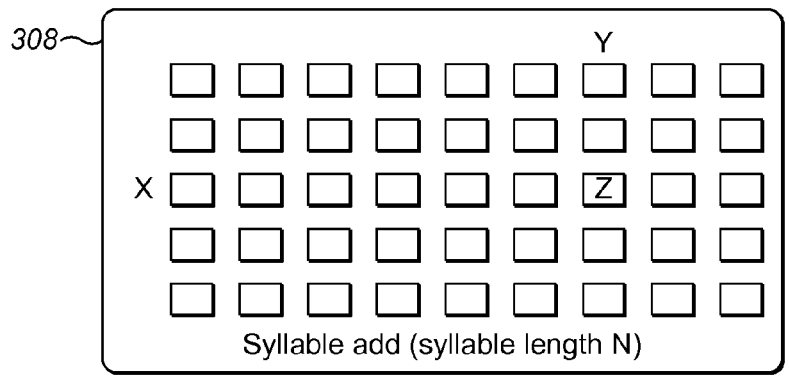

FIG. 12 shows the different string data structure arrays that are used as part of the search and insertion procedures. The main array memory bank is constructed with new words 1202, OneChSylbl array contains words of single character 1204 and SylblStore consists of remaining syllables 1206. In addition, three integer arrays are used namely OneChSylblLoc to flag the location of the single character syllables, SylblAdd to provide the address of the syllable and FindwordLocation memory bank 308 to flag the location of the word in Main array memory bank.

Figure 13:
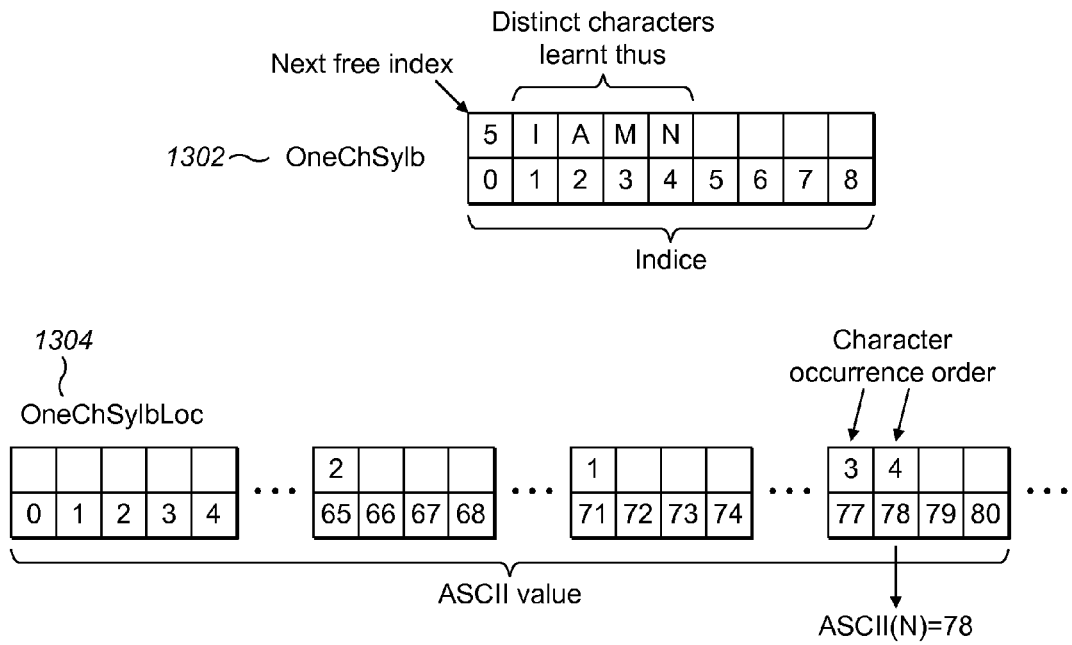
FIG. 13 illustrates using an example the insertion process of a single character syllable.

FIG. 13 shows an example of the insertion process of a single character. OneChSylbl is an array of unique single characters already learnt. For example, when four words are inserted, namely I, AM, A, MAN, OneChsylbl array would have the distinct I, A, M, N characters 1302. Similarly, the integer array OneChSylblLoc shows the number of times the character has occurred so far. The character is tracked as per its ASCII value 1304.

Figure 14:
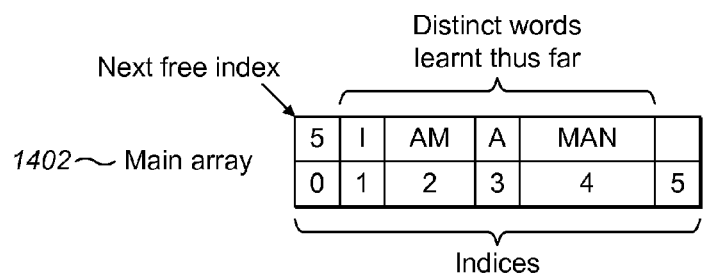
FIG. 14 illustrates using an example the insertion of new words into main array memory bank.

FIG. 14 shows the example of inserting new words as part of the string array named Main Array 1402. It can be clearly seen that I, AM, A, MAN occupies the first four indices with the zeroth index showing the next available free index.

Single character words are added into One Character Syllable data structure 812. The location of the character in the data structure is captured in One Character Syllable Location 812. The location is flagged in an array of ASCII characters which keeps track of how many of those relevant characters have been recorded 1304. The syllables are stored in an array of characters 1302. Main array memory bank is updated with the word as well 814, 1402.

Words of length larger than one is dissected as the first character and remaining syllables. The first character is handled as single character occurrence 812, while the remaining syllables are handled character by character 1002. The syllables are integrated and added to the data structure Syllable Store, while the location of the syllable is tracked in Syllable Location data structure 1010.

Figure 15:
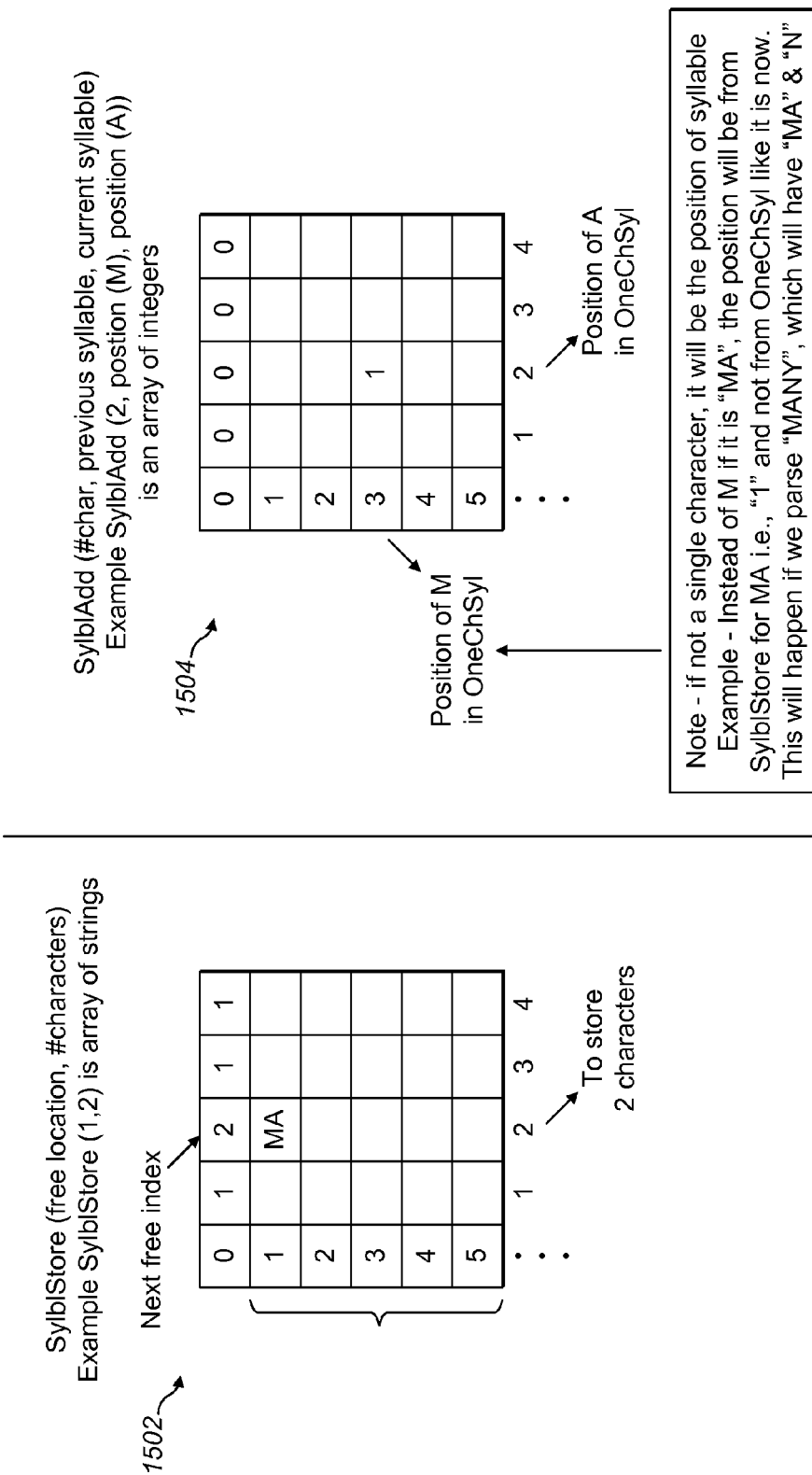
FIG. 15 illustrates using an example the insertion of new words that is not made of single character.

FIG. 15 shows the example to insert a new word that is not a single character. The SylblStore is a string array memory bank that stores the syllables 1502. For example, to insert "MAN", syllable "MA" is stored in SylblStore memory bank in [1, 2] position since it is the first encountered word with two characters. Once inserted, position [0, 2] is incremented to two showing the next available free space for inserting new two character syllable. Similarly the integer array SylblAdd 1504 flags the position of [3, 2] for SylblAdd(2, Position "M", Postion "A"), since "M" occupies third position in OneChsylbl array and "A" occupies second position in OneChSylbl array. If instead of "MAN", the word is "MANY", then the Sylbl Store will have the position of "MA" and "N".

Figure 16:
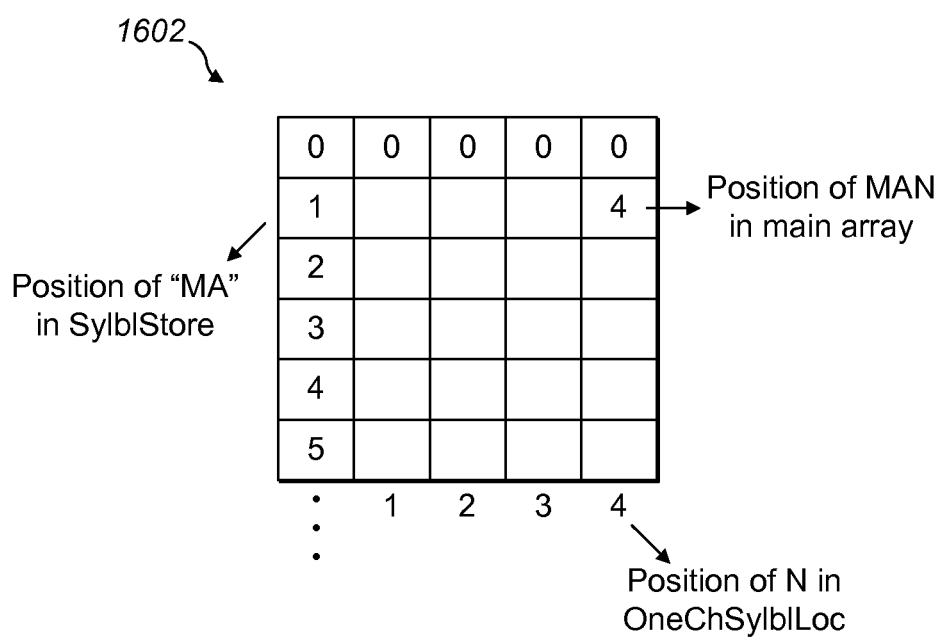
FIG. 16 illustrates using an example the search process of a new word.

FIG. 16 illustrates the searching of new word. For example, if a word "MAN" is to be found using FindWordLocation(3, Location of "MA", Location of "N"). Location of "MA" is one, determined in one step from sylblAdd(2, "M", "A"). Location of "N" is four, from OneChSylblLoc(ASCII(N)). Therefore FindwordLocation memory bank returns the position of the word in Main Array memory bank. If the index is zero, then the word does not exist. Therefore we can see that searching is extremely fast and can be completed in couple of steps by just manipulating an array memory bank. This is so easy compared to generic methods that requires sorting of the strings before searching.

The last character is extracted and the Find Word Location table that tracks the word is constructed. Find Word Location constitutes a collection of tables for words of different lengths. Final Word Location table 1602 shows the position of the three letter word that is searched, namely four, is in the Main Array memory bank at fourth location. If that entry is not four but zero, that means the searched word does not exist. At this point, the word could be inserted using the same procedure used for searching while updating Main Array memory bank.

For example, "MAN" is grouped into "MA" in Syllable Store data structure under two character syllable 1502 followed by the last character "N". The location of "M" and "A" are tracked in Syllable Address table 1504. The word "MAN" is tracked in Find Word Location procedure which clearly shows the position of the full word in Main Array memory bank 1602. If we take "MANY" as an example then the location of syllables "MA" and "N" will be tracked in Syllable Address with last single character being "Y". The word "MANY" will be found using the location of "MAN" and "Y" in Find Word Location table.

Figure 17:
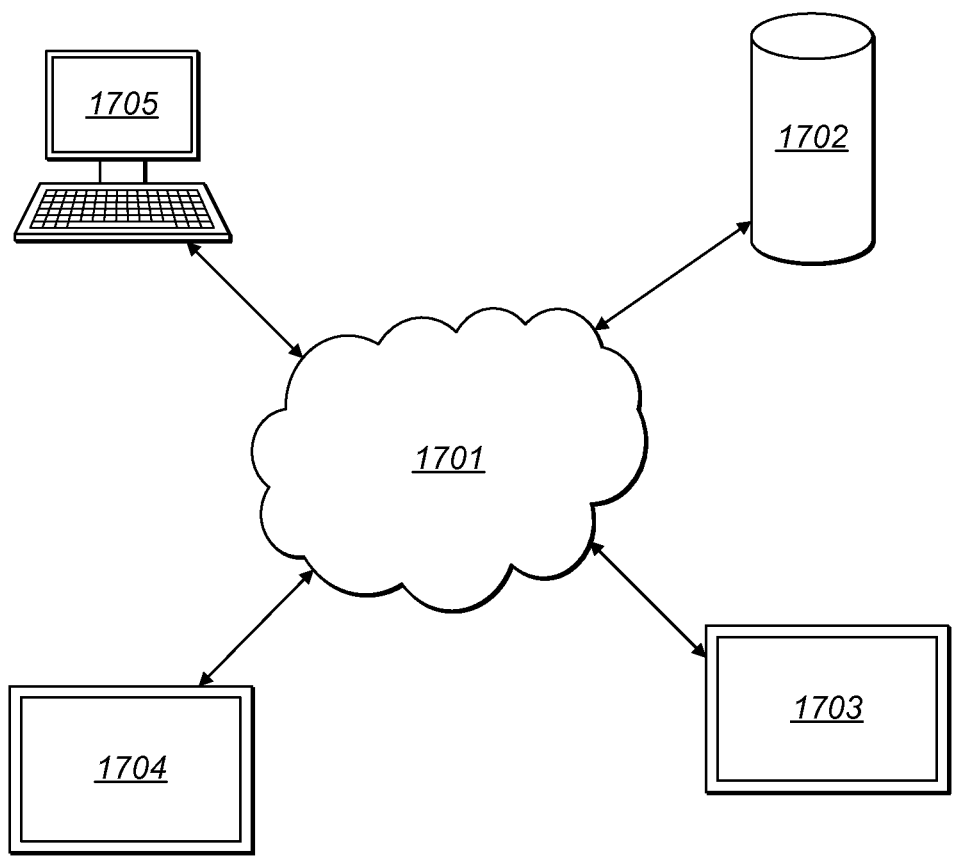
FIG. 17 is a diagrammatic system view of a computer device view in which any of the embodiments disclosed herein may be performed, according to one embodiment.

FIG. 17 is a systematic view of an integrated system for data management 1700 illustrating communication between user and the server through a network, according to one embodiment. In one embodiment a user or multiple users may connect to the server that hosts the multimedia tool in the system. In another embodiment, the user hard ware such as a PDA, mobile device such as tablets etc., computer or a mobile phone or any wireless device, or an electronic book (e-book) may be connected with each other or work independently to allow the user to use the multimedia tool for education, learning, and/or interactively playing games. The network 1701 may be a LAN, WAN, mobile, telecommunications, internet, intranet, WiFi and/or ZigBee network, etc. The user/individual 1705, 1704 and 1703, a database 1702 to store all the information and so on may be an individual, a parent, a scientist, an author, but not limited to these group of folks only. The user and individual are used interchangeably and mean the same. The user may be any person who accesses the data management system for various activities as discussed in different case scenarios in the supporting figures. The cloud server may also be used for storing data and processing. The data management tool may be accessed to search, create content, upload content, view content, use the content and save and/or delete the content. The server may be stand alone, cloud based or hosted services.

Figure 18:
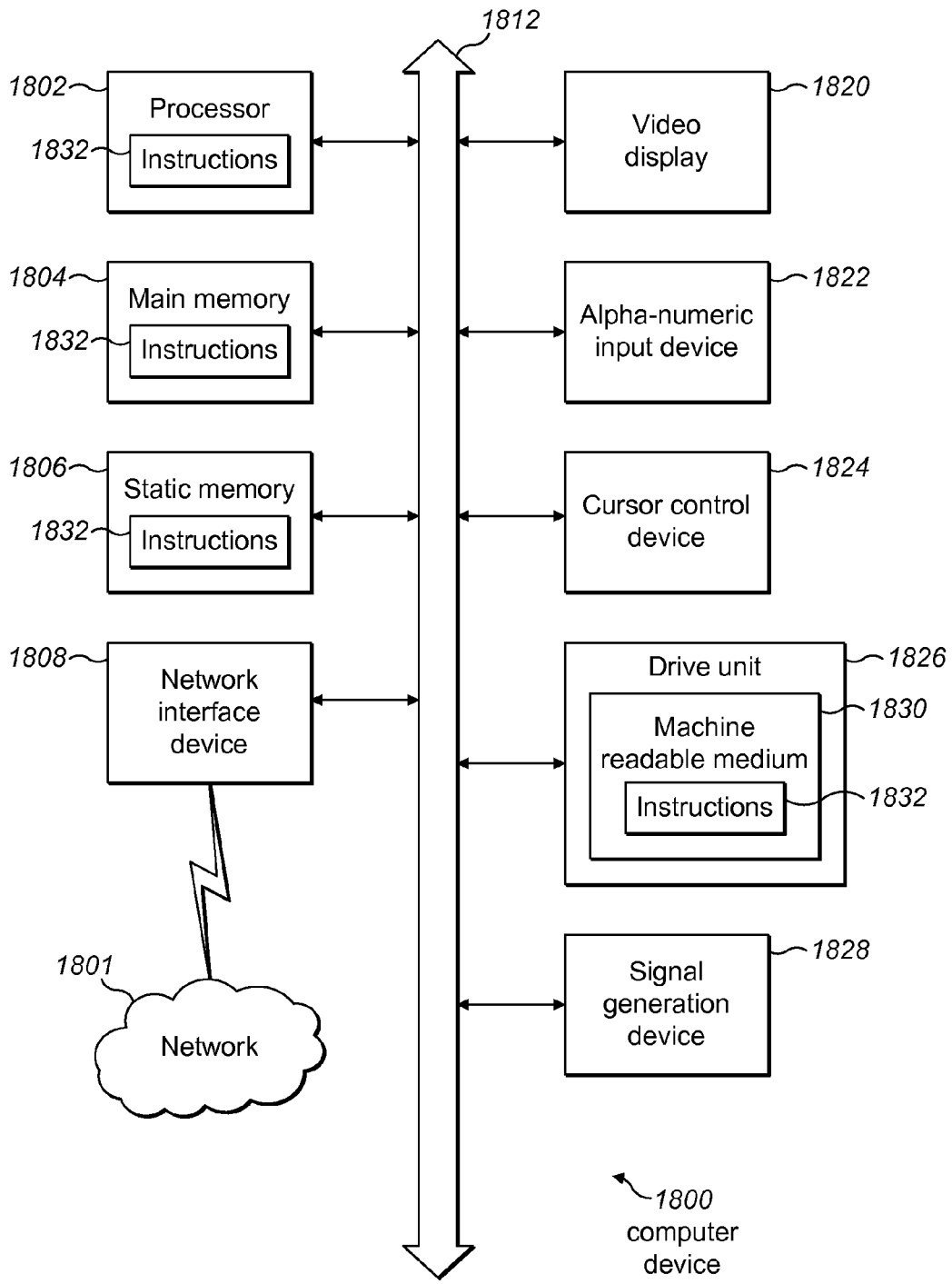
FIG. 18 shows an entire system for processing insertion and search method, according to one or more embodiments.

FIG. 18 is a diagrammatic system view 1800 of a computer device view in which any of the embodiments disclosed herein may be performed, according to one embodiment. Particularly, the computer system view 1800 illustrates a processor 1802, a main memory 1804, a static memory 1806, a bus 1812, a video display 1820, an alpha-numeric input device 1822, a cursor control device 1824, a drive unit 1826, a signal generation device 1828, a network interface device 1808, a machine readable medium 1830, instructions 1832, and a network 1701, according to one embodiment.

The computer system view 1800 may indicate a personal computer and/or a data processing system (e.g., server) in which one or more operations disclosed herein are performed. The processor 1802 may be microprocessor, a state machine, an application specific integrated circuit, a field programmable gate array, etc. The main memory 1804 may be a dynamic random access memory and/or a primary memory of a computer system. The static memory 1806 may be a hard drive, a flash drive, and/or other memory information associated with the computer system. The bus 1812 may be an interconnection between various circuits and/or structures of the computer system. The video display 1820 may provide graphical representation of information on the data processing system. The alpha-numeric input device 1822 may be a keypad, keyboard and/or any other input device of text (e.g., a special device to aid the physically handicapped). The cursor control device 1824 may be a pointing device such as a mouse.

The drive unit 1826 may be a hard drive, a storage system, and/or other longer term storage subsystem. The signal generation device 1828 may be a bios and/or a functional operating system of the data processing system. The network interface device 1808 may be a device that may perform interface functions such as code conversion, protocol conversion and/or buffering required for communication to and from a network 1801. The machine readable medium 1830 may provide instructions on which any of the methods disclosed herein may be performed. The instructions 1832 may provide source code and/or data code to the processor 1802 to enable any one/or more operations disclosed herein.

The instant system, method and process enables the right information at the right time to be intelligently and securely updated, maintained, and recombined dynamically across databases and delivery channels. The constraints and rules may be implemented in compliance to any user/users organization. Accordingly, the specification and drawings are to be regarded in an illustrative rather than a restrictive sense. The invention is valid for general applications that need insertion and searching of a single word or set of words.

What is claimed is:

1. A method, comprising:
   receiving input from an user in form of words, inserting the words that have at least one of a distinct character or one distinct syllable from other the words received;
   searching for at least one of the distinct character, distinct syllable and the word is done before and after inserting;
   storing all the distinct character, distinct syllable and the word in the words sequentially in an order of occurrence in a hardware memory as a memory bank B;
   reassembling the location of a character in memory bank B to a location specified by an ASCII code of the character and store in a memory bank A;
   searching for the character sequentially in a word from the memory bank B by translating the character into a corresponding ASCII code and using the corresponding ASCII code to retrieve a location of the character from the hardware memory as the memory bank A;
   storing the order of occurrence of the character in the word with the corresponding ASCII code in form an address in the memory bank A, wherein the storing of all distinct first two or more character syllables of the input words are stored in memory banks of a size equivalent to the multiple of memory bank B, wherein the locations of all distinct two or more character syllable are placed in memory locations a multiple of memory bank A and the number of memory banks of size A required for location storage for first starting syllable of size N is equal to the number of distinct syllables of size (N−1)
   building a one dimensional array for distinct characters and another one dimensional array for storing their locations;
   building one dimensional array for storing distinct syllables and a three dimensional array for storing their locations;
   building a one dimensional array for inserting distinct words and a three dimensional array to store their locations; and
   using these arrays both for searching and inserting.

2. The method of claim 1, wherein the memory bank A and B is at least 256 bytes in size.

3. The method of claim 1, wherein a UNICODE is used instead of ASCII code where the memory bank A is at least 128 KB while memory bank B is less than 64 KB.

4. The method of claim 1, wherein the storing of all distinct input words of two or more character are stored in memory banks of a size equivalent to the multiple of memory bank B.

5. The method of claim 4, further comprising;
   finding the input word of size N for its location in memory is at a location determined by the location of the starting syllable of size N−1 for this word and the location of the last character of this word.

6. The method of claim 5, further comprising;
   searching for a word of size N requiring its location where it is stored in memory.

7. The method of claim 1, further comprising:
   optimizing time for insertion of input word and its corresponding location based a unordered list stored in the multiple memory banks of size A and B.

8. The method of claim 1, wherein the memory bank may reside in a database or any abstract data type or data structure.

9. The method of claim 1, wherein a common method that can be used for both insertion and searching reducing code complexity and fast access due to multiple memory banks of size A and B and indirect memory addressing.

10. The method of claim 1, further comprising:
    optimizing a time for real-time searching using unordered lists where the data set is created as it is searched and inserted.

11. The method of claim 1, wherein searching and inserting of very large words in the order of occurrence of the character in the word with the corresponding ASCII code in form an address in the memory bank A and memory bank B is done using a MaxDist calculation.

12. The method of claim 1, further comprising:
    performing a search based on an indexed based array wherein a data is stored for fast access in the memory bank A.

13. A system, comprising:
    an input from an user is received in form of a word;
    storing distinct words are sequentially stored in an order of occurrence and their corresponding locations in data structures as a multiple of memory bank B and A respectively;
    a character sequentially accessed in the word from the memory bank B by acquiring its location from memory bank A;
    a first two or more character syllable sequentially accessed in the word from the multiple of memory bank B by acquiring its location from the multiple of memory bank A;
        a word sequentially accessed from the multiple of memory bank B by acquiring its location from the multiple of memory bank A;
    time for insertion is optimized based on an unordered list stored in the multiple of memory bank B; and the word or a set of words is inserted that do not require an insertion application or a search application to stop and take a snapshot of the data and order it so that the complexity of searching can be optimized;
    the location of the character is acquired from memory bank A by using the ASCII code of the character as an address for memory bank A;
    a location of first two character syllable from the multiple of memory bank A is acquired by using the locations of the first and second characters as addresses for the multiple of memory bank A;

a location of first characters syllable of size M from the multiple of memory bank A is acquired by using the location of the syllable having the first (M−1) characters and the location of the last character as addresses for the multiple of memory bank A;

a location of a word of size N from the multiple of memory bank A is acquired by using the location of the syllable having the first (N−1) characters and the location of the last character as addresses for the multiple of memory bank A;

a relevant word is searched by acquiring its location from the multiple of memory bank A without sorting apriori;

and a time for real-time searching is optimized using unordered lists where the data set is created as it is searched and inserted.

14. The system of claim 13, wherein the insertion and searching time and memory requirements of the system directly depends on the size of the words and since there are very large words; to optimize running time and memory space requirements for the system all large words are trimmed to a fixed size using MaxDist calculation.

* * * * *